United States Patent [19]
Merrill

[11] Patent Number: 6,151,562
[45] Date of Patent: Nov. 21, 2000

[54] VEHICLE WHEEL ALIGNMENT DATA BY ROTATING VISION SENSOR

[76] Inventor: M. Stanley Merrill, 2390 S. Tejon, Englewood, Colo. 80110

[21] Appl. No.: 09/122,503

[22] Filed: Jul. 24, 1998

[51] Int. Cl.[7] ................................................ G01B 11/275
[52] U.S. Cl. ...................................... 702/95; 356/139.09
[58] Field of Search .......................... 702/95; 356/139.1, 356/139.09–139.04, 139.05, 139.06

[56] References Cited

U.S. PATENT DOCUMENTS

| | | | |
|---|---|---|---|
| 4,745,469 | 5/1988 | Waldecker et al. | 358/93 |
| 4,856,199 | 8/1989 | Merrill et al. | 33/203.17 |
| 4,863,266 | 9/1989 | Masuko et al. | 356/152 |
| 4,889,425 | 12/1989 | Edwards et al. | 356/152 |
| 4,899,218 | 2/1990 | Waldecker et al. | 358/93 |
| 5,056,233 | 10/1991 | Hechel et al. | 33/288 |
| 5,140,534 | 8/1992 | Miller et al. | 364/560 |
| 5,268,731 | 12/1993 | Fuchiwaki et al. | 356/5 |
| 5,421,095 | 6/1995 | Matteucci | 33/203 |
| 5,488,471 | 1/1996 | McClenahan et al. | 356/139.09 |
| 5,489,979 | 2/1996 | Corghi | 356/139.09 |
| 5,489,983 | 2/1996 | McClenahan et al. | 356/139.09 |
| 5,519,489 | 5/1996 | McClenahan et al. | 356/139.09 |
| 5,600,435 | 2/1997 | Bartko et al. | 356/139.09 |
| 5,724,129 | 3/1998 | Matteucci | 356/139.09 |
| 5,731,870 | 3/1998 | Bartko et al. | 356/139.09 |
| 5,886,781 | 3/1999 | Muller et al. | 356/139.09 |

FOREIGN PATENT DOCUMENTS

| 06011420 | 1/1994 | Japan . |
|---|---|---|

*Primary Examiner*—Marc S. Hoff
*Assistant Examiner*—Craig Steven Miller
*Attorney, Agent, or Firm*—Chrisman, Bynum & Johnson

[57] ABSTRACT

A device and method for measuring vehicle wheel alignment characteristics, and in particular measuring wheel camber and toe, uses a rotating vision sensor such as a laser sensor to map a portion of the vehicle tire and/or rim, allowing for the determination of wheel camber and toe without rotating the wheel. The sensor may be repositioned between the rear and front vehicle wheels. A separate sensor may be used for the left and the right vehicle wheels. The invention has particular utility for auditing of the alignment of vehicles in production lines. The devices and methods may also be used for more general imaging purposes.

23 Claims, 5 Drawing Sheets

VEHICLE WHEEL ALIGNMENT DATA BY ROTATING VISION SENSOR

FIELD OF THE INVENTION

The invention relates to the field of measuring vehicle wheel alignment, and in particular measuring wheel camber and toe. The invention uses a rotating vision sensor such as a laser sensor to map a portion of the vehicle tire and/or rim, which allows for the determination of wheel camber and toe without rotating the wheel. The invention has particular utility for auditing wheel alignment of vehicles through a production line. The invention also relates to the field of computer vision.

BACKGROUND

Correct vehicle suspension and geometry improves the directional stability, tracking, cornering, and overall driveability of a vehicle while also increasing tire tread life and wear. Two primary vehicle wheel alignment characteristics are toe, which is generally defined as the slanting of the wheels toward the front or back of the vehicle, and camber, which is generally defined as the sloping of the wheels toward the top or bottom of the vehicle.

Different vehicle models are designed to be manufactured with different wheel geometries to optimize certain performance characteristics. Even versions of the same model may be manufactured with different wheel geometries, so as to optimize vehicle performance for the driving conditions typically encountered in a particular locality. So, an aligner should be able to measure the characteristics of vehicles having many different settings.

While several different measurement techniques are currently employed, the accurate measurement of wheel alignment is a surprisingly difficult problem to solve in a cost and time efficient manner. In a typical manufacturing process, the wheel alignment is measured in all vehicles as a part of the manufacturing process, and the wheel alignment of a relatively small percentage of vehicles, such as 4%, is measured a second time as an audit for determining the accuracy of the aligner used in the manufacturing process.

It would be desirable to audit a higher percentage of vehicles, so that the accuracy of the alignment process could be improved. However, the audit time of current alignment audit equipment is such that a significantly higher audit rate is not viable. Typical auditing devices currently in use are quite slow, and so cannot keep pace with a production line. So, for example, if one hundred cars are produced in a production line in a given period of time, only four cars may be able to be audited in that given period of time, to obtain a 4% audit percentage. While it may be possible to add more auditing devices to increase the audit percentage, the cost of so doing may be prohibitive.

In light of the above, it can be appreciated that an alignment system that is less expensive, quicker, and more accurate than known systems is a significant advance in the art. Manufacturers may be expected to save on warranty repairs, and vehicle owners may be relieved of the burden of purchasing a new vehicle that is not correctly aligned.

U.S. Pat. No. 5,150,515 of Merrill et al., owned commonly with the present invention, teaches a measurement system that combines a geometric wheel aligner with a dynamic wheel aligner, and so provides a useful reference of prior wheel alignment techniques. U.S. patent application Ser. No. 08/700,666 of Chapin et al. now U.S. Pat. No. 5,812,256, owned commonly with the present invention, teaches a vision system for wheel alignment using moving vision sensors. The moving sensors are described as translating vertically up and down and then side to side to "paint" a target.

Each of the documents referred to herein are hereby incorporated by reference to the extent they include information helpful to a proper understanding of the present invention. It should be understood that no documents or descriptions herein are admitted to be "prior art," but are only mentioned to place the invention in context and to assist in a proper understanding of the invention.

SUMMARY

Devices and methods to characterize the alignment of a vehicle wheel/tire are disclosed.

In an embodiment, a device includes a vision sensor, such as a laser camera, capable of determining spatial coordinates of a group of pixels within a field of vision. The sensor is rotatable to scribe a torus in space, and the device is positioned so that at least a section of the vehicle wheel/tire is within the torus. The sensor thus obtains a collection of spatial coordinates of the wheel/tire, preferably associated with the rotational position of the sensor as it collects the data. A computer calculates the wheel/tire toe, camber, or both from the obtained data. The sensor can be rotated multiple times and the collected data averaged for improved accuracy.

The device preferably includes a vertical support and a blade rotatably mounted on the support. The vision sensor is mounted toward one end of the blade, and a counterweight is mounted toward the other end of the blade.

Another embodiment of the invention uses two devices substantially as described above to characterize the four wheel/tires of a vehicle. One of the devices characterizes the left wheel/tires (front and rear), and the other characterizes the right wheel/tires (front and rear). Each of the two devices slides along a track between the front and rear of the vehicle. The sensor can determine the position of the device by interpreting imaging data as corresponding to a wheel/tire, and in particular to a wheel rim. This embodiment does not strictly require both a left and right device—only one vehicle side could be imaged.

Yet another embodiment combines a device substantially described above in conjunction with another wheel alignment device that is known in the art, such as geometric, dynamic, or "kinetic" aligner. This allows for the advantages provided by the present invention to be combined with advantages provided by known aligners.

The present invention obtains cost and time advantages over known devices. The cost of the invention is relatively low since only one vision sensor need be used to audit a wheel/tire. The time required to audit a wheel/tire is relatively low since it is unnecessary to rotate the wheel/tire in order to perform an audit.

The invention has utility in several contexts. It may be used on a production line as a part of the manufacturing process, or as an audit for a production line, or elsewhere. Further, devices and methods according to the present invention may be used in contexts other than wheel alignment.

DETAILED DESCRIPTION

In overview of an embodiment of the present invention, a vision sensor such as a laser camera is used to determine toe and camber of a vehicle wheel. The laser camera is rotated in a circle that lies in a plane that is generally parallel to the plane of the wheel. The field of vision of the rotated sensor scribes a torus in space that is "seen" by the camera. The wheel and sensor are positioned so that the wheel rim is within the torus so that the rim is seen by the camera. In this context, the camera sees the rim (or other object within the torus) as a collection of pixels, defined by the camera resolution, that each have an x-y-z coordinate or other coordinate system position such as polar coordinates. In an embodiment, the camera takes "slices", each slice including the coordinates in space of a number of points (such as 96) taken along a line.

The angular position of the sensor as a function of time is measured and recorded along with the x-y-z data seen as a function of time. The sensor is engaged with a computer that stores the data. The computer calculates the plane of the rim (or other identifying tire/wheel feature) based upon the observed data. The attitude of the plane of the rim corresponds exactly to an identifiable toe and camber. Thus, the present invention provides a measurement of toe and camber using a single vision sensor and without rotating the wheel. The invention also includes additional aspects that are described below.

Figure 1:
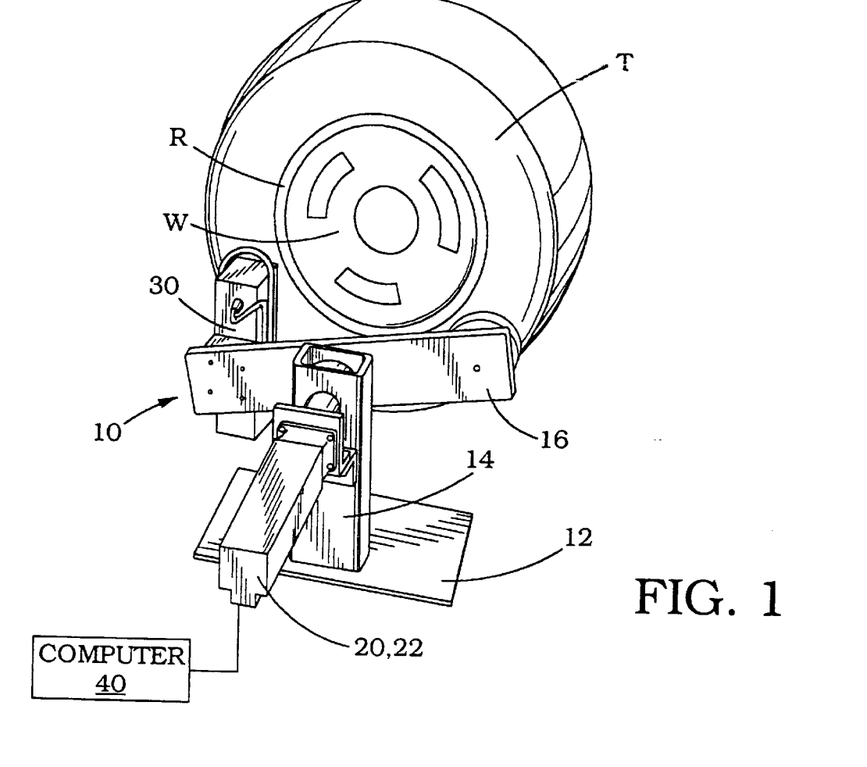
FIG. 1 is a perspective view of a device according to an embodiment of the present invention along with a wheel and tire.
Figure 2:
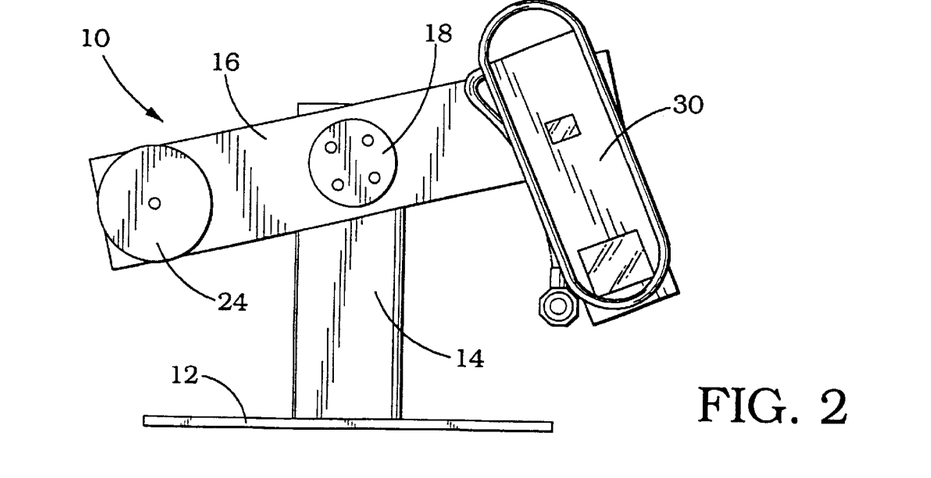
FIG. 2 is a front elevation view of the device according to the embodiment of FIG. 1.

A device 10 embodying a broad aspect of the present invention is shown in perspective view along with a wheel (W) and tire (T) mounted on the wheel in FIG. 1, and in a front elevation view in FIG. 2.

The device 10 includes a base 12 and a vertical support 14 extending upward from the base. A rotating blade 16 is pivotally connected to an upper section of the support 14 at a spindle 18. The spindle 18 is rotatable to a predefined speed by a motor 20. The motor 20 includes (or is engaged with) suitable equipment 22 for monitoring and recording positional data of the blade 16. This may be a rotary encoder, a rotary potentiometer, a stepping moter, etc.

A vision sensor 30 is positioned toward one end of the blade 16. A counterweight 24 is positioned toward the other end of the blade 16 so that the blade 16 is balanced during rotation. While the above described blade 16 structure is a preferred structure to rotate the vision sensor 30, it will be appreciated that other means to rotate the vision sensor could be employed. For example, the sensor could be mounted on a circular track, and slid around the track. Or; the sensor could be positioned on the end of a rod that rotated in a circle.

Figure 3:
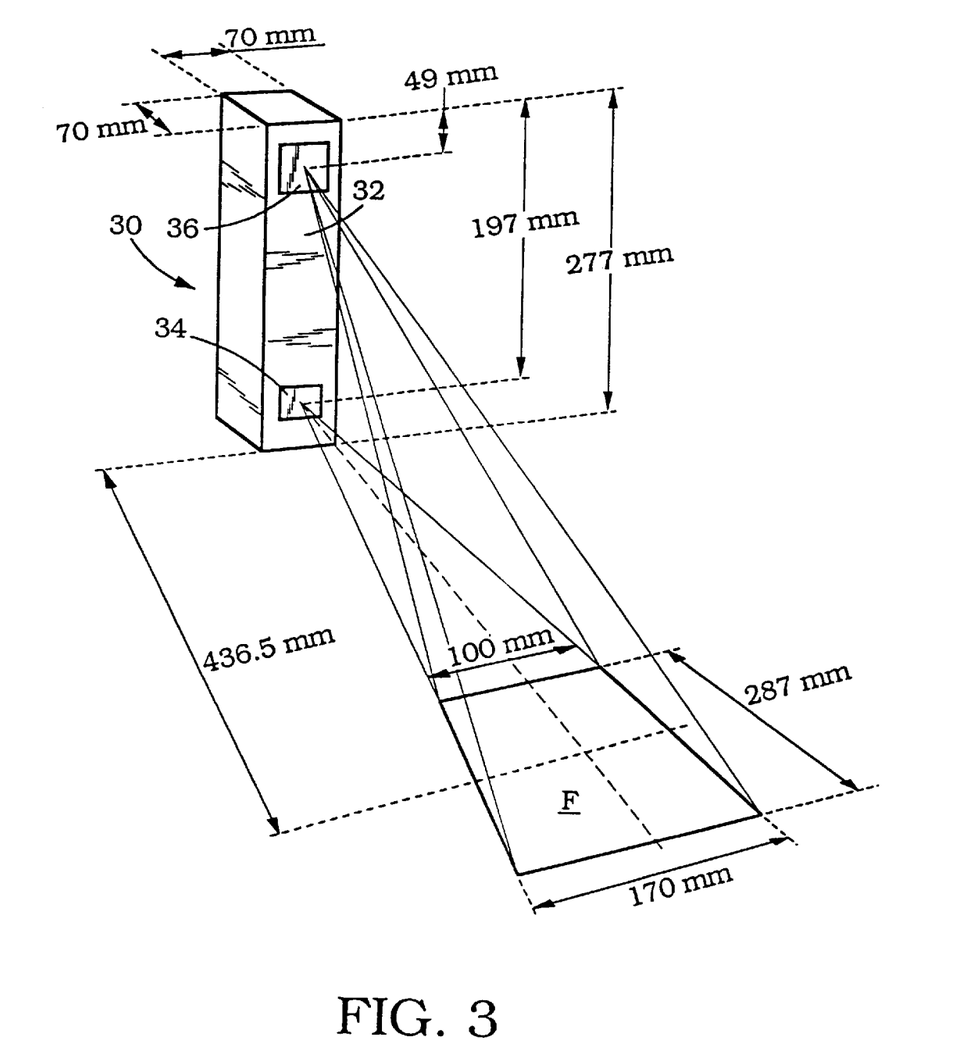
FIG. 3 is perspective schematic view of a vision sensor preferably used in the embodiment of FIG. 1.

A suitable vision sensor 30 is shown in FIG. 3. The vision sensor 30 incorporates a digital camera capable of measuring by triangulation, such as a laser camera sold commercially as the "MDC-250" of Medar, Inc. (Farmington Hills, Mich.) into a housing 32. The sensor 30 has a laser window 34 through which a beam of coherent light is emitted to intersect a target, and a camera window 36 engaged with a camera offset from the laser window 34. The laser window and camera window each have a field of vision, which intersect with one another to form a resulting field of view (F) for the sensor 30. Other vision sensors may be expected to perform similarly. It should be understood that the above vision sensors are representative only, and that the present invention includes any other machine vision device capable of imaging a volume of space and determining coordinates of a set of pixels within the space.

With reference again to FIG. 1, a wheel (W) (having a rim (R)) on which tire (T) is mounted is positioned in front of the device 10. The wheel (W) is positioned so that the rim (R) is within the field of view of sensor 30. Thus, a preferred distance for the above described sensor 30 is about 436.5 mm, although the position is not critical so long as the rim (R) is within the field of view (F). Most preferably, the plane of the wheel is parallel to the plane of rotation of the sensor. However, the device 10 can perform satisfactorily even if the wheel is at an angle to the plane of rotation of the sensor 30, provided that the angle is known and is within the operating specifications of the sensor.

The sensor 30 is rotated, via the motor 20, and the sensor 30 acquires the image data within its field of view (F) and stores the data within the computer 40. Via the equipment 22, the angular position of the sensor 30 is also determined and stored within the computer 40. Thus, the computer 40 stores a set of image data which is a collection of spatial coordinates for each acquisition, that is referenced by the angular position of the sensor.

The computer 40 calculates the plane of the wheel (W) from the data stored within the computer 40. It is possible to determine the plane after one complete revolution of the sensor 30 around the wheel (W), or even before one complete revolution. Preferably, the means for rotating the vision sensor rotates the sensor at least one revolution. During the revolution, the sensor 30 collects data at a number of positions (i.e., it takes a number of "shots" or "slices" of the wheel/tire). For example, to view the wheel/tire at every 10 degrees, 36 slices would be taken (which is 360 degrees/10 degrees).

The means for rotating the sensor could rotate the sensor multiple times and the data could be averaged to provide statistically improved data. From the plane of the wheel (W), the toe and camber of the wheel can be determined by known techniques. The computer can store, print, and display the raw and calculated data as is known in the art.

It can be appreciated that the present invention allows for the measurement of toe and camber of a wheel using only one sensor, and without rotating the wheel. It is noted that the measurements are not necessarily absolute, because the wheel is not rotated and so the actual plane or trajectory of rotation is not determined. Stated another way, the "runout" of the wheel is not known. Surprisingly, however, this is not a real problem so long as the wheels are relatively precise, such as either new or machined aluminum or "mag" style wheels. The invention has particular, though not exclusive, utility as an audit machine for manufacturing processes, since the wheels of newly manufactured vehicles will generally have negligible runout.

While the above embodiment has only one sensor 30, it will be appreciated that more than one sensor could be used, for example by replacing the counterweight 24 with another sensor, and averaging the results obtained by the two sensors. It will also be appreciated that the wheel could be rotated as the sensor revolves, provided that the wheel and sensor do not rotate in resonance with one another, so that sensor can "see" an adequate number of points of the wheel (W).

Figure 4A:
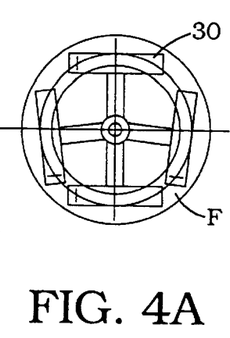
FIGS. 4A, 4B, and 4C are schematic representations of the swept volume of a camera vision sensor in relation to the position of a rim to be characterized.
Figure 4B:
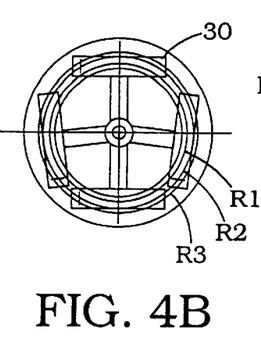
Figure 4C:
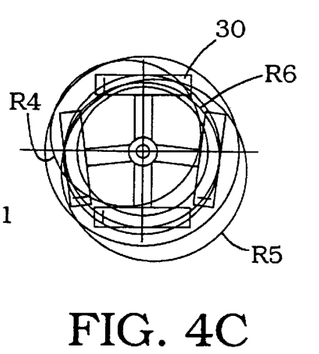

Another surprising advantage of the present invention is that it is not necessary for the center of the wheel (W) to be exactly aligned with the center of rotation of the sensor 30 (i.e., the spindle 18). This is understood with reference to FIGS. 4A, 4B, and 4C. FIG. 4A shows the motion of the sensor 30 as it is revolved and the resulting field of vision (F). FIG. 4B shows the outlines of three rims R1, R2, R3 having differing diameters that are centered in relation to the device 10. It can be appreciated that each of the rims are within the field of vision (F) and can thus be characterized. FIG. 4C shows the outlines of three rims R4, R5, and R6, having differing diameters that are not centered in relation to the device 10. Depending upon the diameter of the rim and the degree of offset between the center of the rim and the device 10, enough of each rim may be within the field of vision (F) to characterize the rim. It is not necessary for the entirety of the rim to be within the field of vision, as the rim may be characterized if only a portion of the rim is seen by the vision sensor 30.

The present invention provides for enhanced accuracy in the determination of wheel/tire characteristics, which can be understood in light of the following discussion. The location of three points in space establishes a plane. Thus, in an embodiment of the invention, only three points on the wheel are taken by taking image data at three separate rotational positions of the sensor 30 (in fact, this would provide more than three points, as "slices" are taken. Conceptually, three points would be sufficient). However, any error in the determination of the actual position of one of the three points will cause an error in the determination of toe or camber. For example, a positional error of about 0.001 inch will cause a toe or camber error of about 0.01 degree, which is about the outer limit of acceptable tolerance in typical applications. In a preferred aspect of the present invention, multiple points are taken and the plane is determined by statistical computation. The accuracy of the calculated plane (and the toe and camber) can thus far exceed the accuracy with which the position of any given point is determined. In general, it has been found that using the position of eighteen slices on the wheel/tire provides near-maximum accuracy and that using more slices is largely redundant. While the invention includes taking more or less than eighteen slices, eighteen is a preferred number, with the understanding that taking somewhat more or less may be functionally equivalent.

Yet another aspect of the invention is the ability to characterize the sidewall of the tire (T). This is done similarly as the determination of the toe and camber, except that tire (T), instead of the rim (R), is characterized. In this context, by "characterized" it is meant that the imaged data is analyzed to determine whether the tire has any irregularities in its sidewalls. Such irregularities can be identified by asymmetrical portions of the tire (T). Because the present invention has utility to characterizing the combination of a wheel, a tire, or the combination (as is usually the case), the expression "wheel/tire" is used herein to refer to either a wheel or a tire or both.

Figure 5:
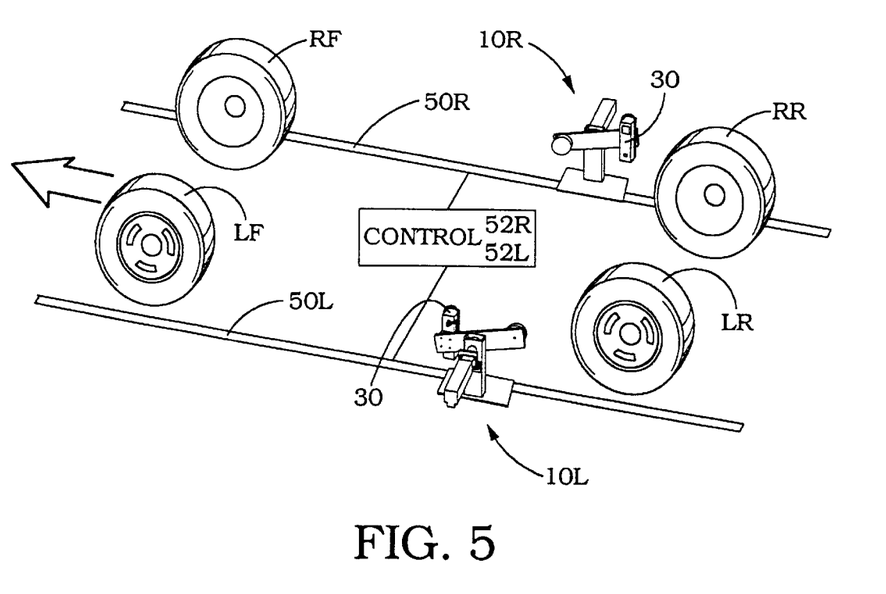
FIG. 5 is a perspective view of an embodiment of the invention within a station that allows for measurement of front and rear wheel alignment.

Another embodiment of the invention is described in connection with FIG. 5, wherein like elements as in the above-described embodiment are commonly numbered. The embodiment of FIG. 5 is for measuring the alignment of all four wheels, separately labeled LF, RF, LR, and RR of a vehicle. The vehicle itself is omitted from FIG. 5 for clarity. Two tire alignment devices, labeled 10L and 10R, are used, each being substantially similar to each other and to the above-described device 10. The device 10L is used to characterize the LR and LF wheels. The device 10R is used to characterize the RR and RF wheels.

The device 10L is positioned on a track 50L that extends between the positions of the wheel LR and the wheel LF. The device 10R is positioned on a track 50R that extends between the positions of the wheel RR and the wheel RF. The tracks 50L, 50R include a belt, chain, or similar means for sliding the respective units between the rear and front positions, and a motor or other suitable means for powering the sliding means.

In a first measuring step, the device 10L is positioned adjacent the LR wheel and the device 10R is positioned adjacent the RR wheel. The characteristics of the LR wheel and the RR wheel are determined by rotating the vision sensors 30, as described above.

In a positioning step, the device 10L is positioned from the LR wheel to the LF wheel by sliding along the track 50L, and the device 10R device is positioned from the RR wheel to the RF wheel by sliding along the track 50R.

In a second measuring step, the device 10L is positioned (in the above-described positioning step) adjacent the LF wheel and the device 10R is positioned adjacent the RF wheel. The characteristics of the LR wheel and the RR wheel are determined by rotating the vision sensors 30L, 30R as described above. Thus, the alignment of four wheels can be measured using only two vision sensors 30, in a minimum amount of time required to position the devices 10L, 10R. Note that the sensor devices 10L and 10R have been described as moving from the rear of a vehicle to the front; it can be appreciated that the sensors could as well move from the front of a vehicle to the rear. Further, while both left and right sensing units are described, the invention could be practiced using only one unit.

Preferably, the tracks 50L, 50R are controlled by control units 52L, 52R respectively (which may be combined into one physical unit). The control units position the units 10L and 10R so that the wheels can be properly seen by the units (i.e, in the relative position as shown in FIG. 1). One aspect of the control units is finding the rims. One way of doing so is explained with reference to the representative data of FIG. 6, a graph (arbitrary units) showing the relative depth of a typical wheel and tire (on the y-axis) as a function of position (on the x-axis). The position is along the direction of movement of the devices 10L, 10R on the tracks 50L, 50R, and the depth is perpendicularly away from the tracks. In the region I, the sensor 30 is seeing the center of the wheel, and the distance becomes less as the wheel widens towards the rim. At point II, the rim is seen. Between points II and III, the distance becomes greater, corresponding to the gap between the rim and the tire. Between point III and region IV, the distance becomes less, as the sensor sees the tire.

Figure 6:
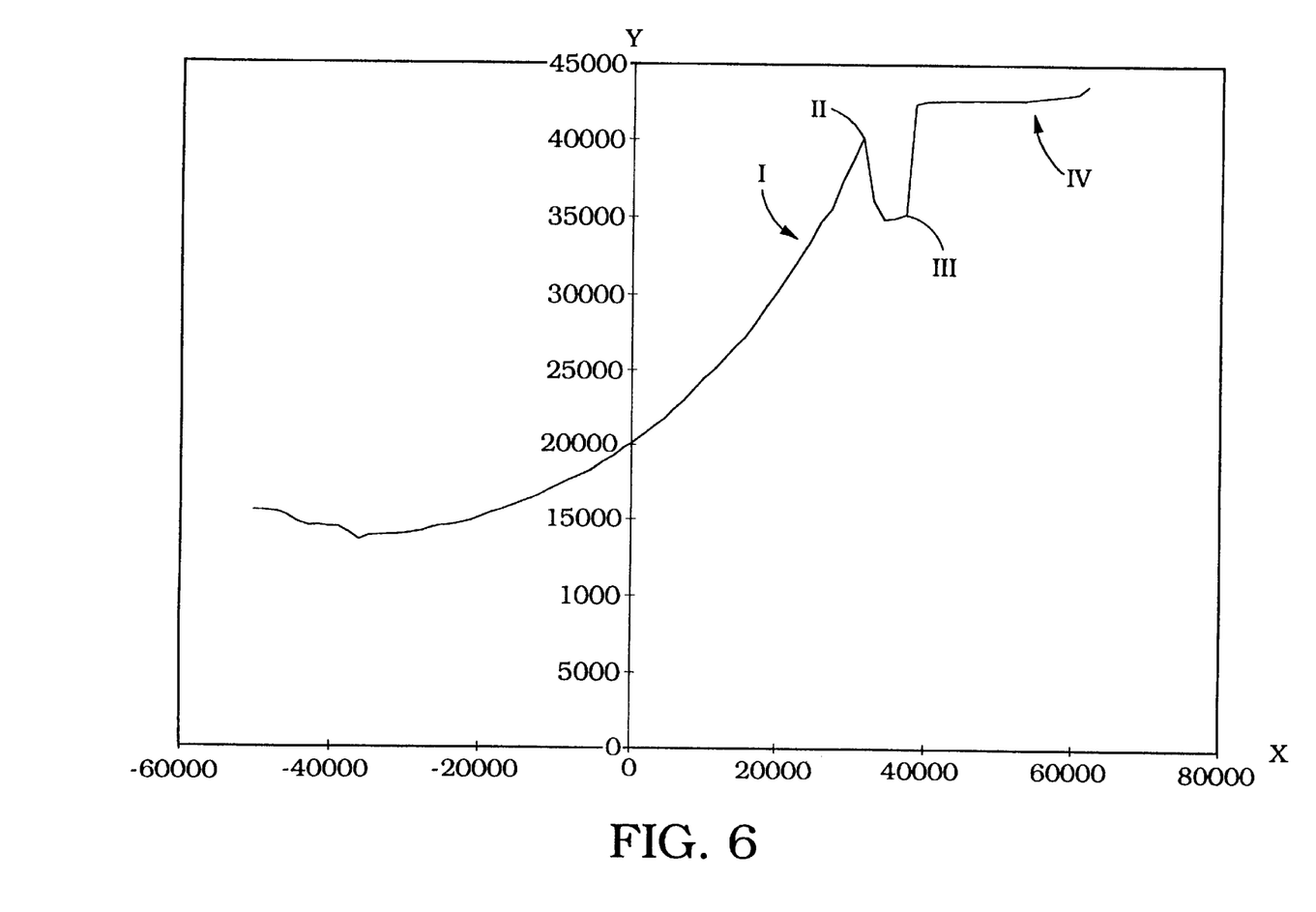
FIG. 6 is a graph showing a depth profile a typical wheel/tire as seen by an embodiment of the present invention.

The point II can easily be detected by standard computer vision techniques because of the sharp change in slope of the curve. Thus, the sensor can detect the rim of a wheel, and the control units 52L, 52R can position the sensors with respect to the wheel (W) for taking measurements. It should be understood that other positioning techniques may be used instead of or in addition to the above described technique.

The control units 52L, 52R may include optional features, such as multi-speed operation. The control units may move the devices 10L, 10R along the tracks 50L, 50R at certain speed along the length between the rear wheels (LR, RR) and the front wheels (LF, RF), and moving the devices 10L, 10R along the track at another (preferably slower) speed as the sensors 30 are in the vicinity of the front wheels for taking measurements corresponding the data of FIG. 6. The devices are determined to be in the vicinity of the front wheels by imaging information and computer vision analysis similar to that described above in connection with FIG. 6. Alternatively (or additionally), the devices 10L, 10R can be programed with the wheelbase dimensions of the subject vehicles and move that predefined distance. The measurement of FIG. 6 can (but need not) be used to precisely position the devices 10L, 10R.

Figure 7:
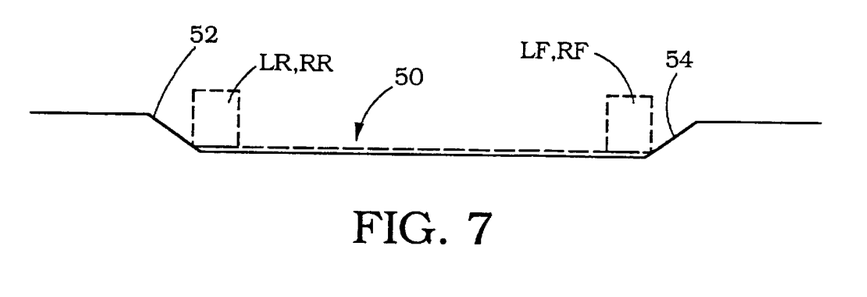
FIG. 7 is a side elevation view of a ramp system useful in an embodiment of the invention.

Another optional aspect of the invention is shown in FIG. 7. The tracks 50L, 50R (designated generally as 50 in FIG. 7) are placed between a rear ramp 52 and a front ramp 54. The tracks 50L, 50R are preferably dimensioned so that the rear wheels RL, RR can be situated adjacent the rear ramp 52 while the front wheels LF, RF are situated adjacent the front ramp 54. The ramps may assist in the positioning of the sensors 30L, 30R with respect to the wheels.

Figure 8:
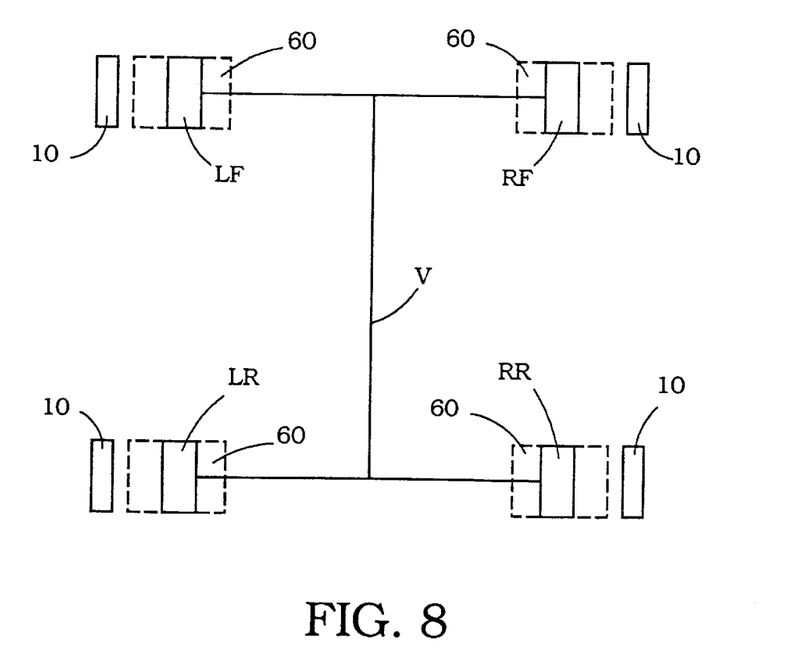
FIG. 8 is a plan schematic view of an embodiment of the invention in combination with known wheel aligners.

Still another embodiment of the invention is described with reference to the plan schematic view of FIG. 8. A vehicle (V) has a left front wheel/tire LF, right front wheel/tire RF, left rear wheel/tire LR, and right rear wheel/tire RR. Associated with each wheel/tire is a wheel alignment detection device 10, according an above described embodiment. Also associated with each wheel/tire is a conventional wheel aligner 60. The conventional wheel aligner 60 may be any geometric aligner, any dynamic aligner, an aligner such as described in U.S. Pat. No. 5,150,515, or otherwise. Such conventional aligners 60 are commonly used in vehicle production assembly lines for the purpose of aligning the wheel/tire of a new vehicle. A major problem in vehicle production is ensuring that the conventional aligners are operating properly, which is typically done by auditing a small percentage of the total vehicles that are manufactured. Of course, sampling a small percentage can never ensure that the non-sampled vehicles are within specification. The embodiment of FIG. 8 allows for a user to verify that the measurements obtained by each device 10 agree with each device 60, and to investigate if not. It should be appreciated that it is not essential that each device 10 of FIG. 8 be identical with each other device 10, or for each device 60 of FIG. 8 to be identical with each other device 60, or for all four wheel/tires of FIG. 8 to be associated with a device 10 and a device 60. Any subcombination could be used. A wheel alignment system including a device 10 and a device 60 allows for the retention of the advantages of known aligners, along with the benefit of the advantages of the aligners of the present invention.

It should be appreciated that the present invention is not limited to visualization performed strictly by rotating a vision sensor in a circular arc. The invention also encompasses rotating the vision sensor in a non-circular arc, such as for example, in a curve that is non-circular. Also, it may not be necessary to rotate the sensor in a complete revolution. Further, rotation (in any curve) can be combined with linearly translation of the sensor. An example of linear translation is provided in application. Ser. No. 08/700,666. The combination of linear translation and curvilinear rotation as provided above can be achieved, for example, by mounting a vision sensor on the end of a programmable robotic arm, such robotic arms being known in the art of robotics. For example, a sensor mounted on the end of a robotic arm may follow a path which roughly sweeps over an object to be visualized, such as a chair. The sensor takes slices (images) as it is swept. The three-dimensional form of the chair can be reconstructed by connecting points obtained in each slice with similar points in adjacent slice(es), thereby completing a model in space of the chair.

Any type of motion of the sensor is contemplated. For example, the sensor could rotate in a circle while simultaneously being translated horizontally. Such a pattern may be useful to determine the profile of a side of a car, and may be particularly useful if certain aspects of the car profile are known a priori.

As used herein, each slice is a line in space consisting of a number of points (such as 96 points in an embodiment), and the coordinate of each point. Comparing features in adjacent slices (i.e., points and/or groupings of points), and smoothing the slices to form a continuous or near continuous image, allows for the image to be formed. The accuracy of the image is greater than the accuracy of the sensor in determining the coordinates of any individual points or slices, as the smoothed image is the result of many points in many slices.

While the above descriptions of determining the camber and toe of vehicle wheel/tires are an important aspect of the present invention, broader applications are also significant.

It can now be fully appreciated that the present invention teaches the determination of vehicle wheel camber and toe using a rotating vision sensor. The determination does not require (or preclude) the rotation of the vehicle wheels. Information about the structure of an object to be visualized, such as a wheel/tire, can be used by the device to position the device and facilitate the process. It should be understood that the above description is provided for the purposes of illustration of embodiments of the invention and should not be construed to limit the scope of the invention. No component should be considered critical to the practice of the invention unless that is specifically noted. Further, the invention could be combined with many other components or systems. The scope of the invention should be determined by the claims and their legal equivalents.

What is claimed is:

1. A device for measuring alignment characteristics of a vehicle wheel/tire, comprising:

a vision sensor having a field of vision and being capable of determining spatial coordinates of a group of pixels within the field of vision;

the field of vision being sufficiently sized to detect a portion of a vehicle wheel/tire to be characterized;

means for rotating the vision sensor so that the vision sensor field of vision scribes a torus in space, whereby a collection of spatial coordinates of pixels are obtained at more than one position of the torus; and a computer for calculating from the collection of spatial coordinates a wheel alignment characteristic of the wheel/tire selected from the group consisting of too, camber, and both toe and camber wherein said vision sensor rotates while the collection of spatial coordinates is being obtained.

2. The device of claim 1, further comprising means for determining angular position of the vision sensor as the vision sensor is rotated.

3. The device of claim 1, including a vertical support and a blade having two ends rotatably mounted on the support, wherein the vision sensor is mounted toward one end of the blade.

4. The device of claim 3, wherein a counterweight is mounted toward the other end of the blade.

5. The device of claim 1, wherein the vision sensor is a laser camera.

6. The device of claim 1, wherein the means for rotating the vision sensor are capable of rotating the vision sensor at least one complete revolution.

7. The device of claim 6, wherein the means for rotating the vision sensor are capable of rotating the vision sensor a plurality of revolutions, and the vision sensor obtains pixel coordinates for each of the plurality of revolutions.

8. A method for determining alignment characteristics of a vehicle wheel/tire, comprising:

positioning a vision sensor having a field of vision and capable of determining spatial coordinates of a group of pixels within the field of vision with respect to a vehicle wheel/tire to be characterized, such that at least a portion of the wheel/tire is within the sensor field of vision;

rotating the vision sensor with respect to the wheel/tire so that the vision sensor is positioned at more than one angular position with respect to the wheel/tire obtaining a collection of spatial coordinates of pixels at more than one angular position of the vision sensor; and calculating from the collection of spatial coordinates a wheel alignment characteristic of the wheel/tire selected from the group consisting of toe, camber, and both toe and camber wherein said vision sensor rotates while the collection of spatial coordinates is being obtained.

9. The method of claim 8, wherein the rotating step includes rotating the vision sensor at least one complete revolution.

10. The method of claim 9, wherein the rotating step includes rotating the vision sensor more than one complete revolution.

11. The method of claim 8, wherein the step of obtaining a collection of spatial coordinates of pixels at more than one angular position of the vision sensor is performed at about eighteen angular positions of the vision sensor.

12. A device for measuring wheel alignment of the front and rear wheel/tires of vehicle, comprising:

a vision sensor having a field of vision and capable of determining spatial coordinates of a group of pixels within the field of vision;

means for rotating the vision sensor so that the vision sensor field of vision scribes a torus in space, whereby a collection of spatial coordinates of pixels are obtained at more than one position of the torus;

a computer for calculating from the collection of spatial coordinates a wheel alignment characteristic selected from the group of toe, camber, and both toe and camber; and a track, the vision sensor being slidably engaged with the track from a first position to a second position, the first position corresponding to a first wheel/tire of a vehicle to be characterized and the second position corresponding to a second wheel/tire to be characterized.

13. The device of claim 12, further comprising means for sliding the vision sensor from the first position to the second position.

14. The device of claim 13, further comprising a controller for controlling the sliding means.

15. The device of claim 14, wherein the controller causes the vision sliding means to slide at variable speed along the track.

16. The device of claim 15, wherein the sliding means slides at a slower speed at a position in the vicinity of the wheels than at a position further from the wheels.

17. The device of claim 16, wherein the controller determines the position of the vision sensor with respect to at least one of the wheel/tires by interpreting a collection of spatial coordinates corresponding to the wheel/tire.

18. The device of claim 17, wherein the controller determines the position of the vision sensor with respect to at least one of the wheel/tires by interpreting a collection of spatial coordinates corresponding to a wheel/tire rim.

19. The device of claim 12, further comprising a ramp for positioning at least one vehicle wheel/tire.

20. The device of claim 12, further comprising an additional vision sensor, means for rotating the vision sensor, and track;

whereby the vision sensor determines the characteristics of one set of a left front and rear vehicle wheel/tire set and a right front and rear vehicle wheel/tire set; and the additional vision sensor determines the characteristics of the other set.

21. A method for measuring wheel alignment of the front and rear wheel/tires of a vehicle, comprising the steps of:

positioning a vision sensor with respect to one of the front and rear vehicle wheel/tires, the sensor having a field of vision and being capable of determining spatial coordinates of a group of pixels within the field of vision, the vision sensor being engaged with means for rotating the vision sensor so that the vision sensor scribes a torus in space, whereby a collection of spatial coordinates of pixels is obtained at more than one position of the torus;

calculating from the collection of spatial coordinates a wheel alignment characteristic selected from the group consisting of toe, camber, and both toe and camber for the one of the front and rear wheel/tires;

sliding the vision sensor along a track from a first position corresponding to one of the vehicle front and rear wheel/tires to a second position corresponding to the other of the vehicle front and rear wheel/tires; and calculating from the collection of spatial coordinates a wheel alignment characteristic selected from the group consisting of toe, camber, and both toe and camber for the other of the front and rear wheel/tires;

wherein said vision sensor rotates while the collection of spatial coordinates is being obtained.

22. A wheel alignment system, comprising:

a vision sensor having a field of vision and being capable of determining spatial coordinates of a group of pixels within the field of vision;

the field of vision being sufficiently sized to detect a portion of a vehicle wheel/tire to be characterized;

means for rotating the vision sensor so that the vision sensor field of vision scribes a torus in space, whereby a collection of spatial coordinates of pixels is obtained at more than one position of the torus; and a computer for calculating from the collection of spatial coordinates a wheel alignment characteristic of the wheel/tire selected from the group consisting of toe, camber, and both toe and camber; and an additional wheel alignment device (60) for characterizing the wheel/tire;

wherein said vision sensor rotates while the collection of spatial coordinates is being obtained.

23. The wheel alignment system of claim 22, further comprising a plurality of vision sensors and associated means for rotating the plurality, and a corresponding plurality of additional wheel alignment devices (60), for characterizing a plurality of wheel/tires.

* * * * *